(12) United States Patent
Bouilloux-Lafont et al.

(10) Patent No.: US 7,640,562 B2
(45) Date of Patent: Dec. 29, 2009

(54) SELECTING ADVERTISEMENT ON A SET TOP BOX IN A TELEVISION NETWORK

(75) Inventors: Hélène Bouilloux-Lafont, Issy les Moulineaux (FR); Oliver Bister, Boulogne Billancourt (FR); Franck Bachet, Houdan (FR); Axel Taldir, Savigny sur Orge (FR)

(73) Assignee: THOMSON Licensing S.A., Boulogne-Billancourt (FR)

( * ) Notice: Subject to any disclaimer, the term of this patent is extended or adjusted under 35 U.S.C. 154(b) by 387 days.

(21) Appl. No.: 10/533,848

(22) PCT Filed: Nov. 4, 2003
(Under 37 CFR 1.47)

(86) PCT No.: PCT/EP03/50787

§ 371 (c)(1),
(2), (4) Date: Jan. 25, 2006

(87) PCT Pub. No.: WO2004/042625

PCT Pub. Date: May 21, 2004

(65) Prior Publication Data

US 2007/0028261 A1 Feb. 1, 2007

(30) Foreign Application Priority Data

Nov. 5, 2002 (EP) .................................. 02292751

(51) Int. Cl.
*H04N 7/10* (2006.01)
*H04N 7/16* (2006.01)
*H04H 60/32* (2008.01)

(52) U.S. Cl. .............................. 725/34; 725/29; 725/14

(58) Field of Classification Search .................... 725/34, 725/29, 14
See application file for complete search history.

(56) References Cited

U.S. PATENT DOCUMENTS

| 6,216,112 B1 * | 4/2001 | Fuller et al. .................... 705/14 |
| 2002/0046102 A1 | 4/2002 | Dohring et al. |
| 2003/0229531 A1 * | 12/2003 | Heckerman et al. ........... 705/10 |
| 2006/0029368 A1 * | 2/2006 | Harville ....................... 386/69 |

FOREIGN PATENT DOCUMENTS

WO    WO-99/59283 A2    11/1999

* cited by examiner

*Primary Examiner*—Christopher Kelley
*Assistant Examiner*—Franklin S Andramuno
(74) *Attorney, Agent, or Firm*—Osha • Liang LLP

(57) ABSTRACT

A method for selecting advertisement in a Set Top Box (STB) of a television network comprises receiving advertisement selection information for one or a plurality of advertisement associations. Each advertisement association associates an advertisement space with an advertisement. The advertisement selection information corresponds for each advertisement association to a value of probability for selecting the advertisement for the advertisement space. A selection of an advertisement for a determined advertisement space is triggered and a random value or a pseudo-random value generated. An advertisement is selected using the random value or the pseudo-random value, by selecting a determined advertisement association that associates an advertisement with the determined advertisement space and for which the corresponding advertisement selection information has a value of probability that relates to the random value or the pseudo-random value. The advertisement associated in the determined advertisement association is used.

9 Claims, 6 Drawing Sheets

SELECTING ADVERTISEMENT ON A SET TOP BOX IN A TELEVISION NETWORK

FIELD OF THE INVENTION

The invention relates to a system for selecting an advertisement on a Set Top Box (STB) in a television network

BACKGROUND OF THE INVENTION

FIG. 1 shows a typical computer network 100 as known from prior art. The computer network 100 may comprise devices of various nature which are connected and may communicate with each other through the network. The computer network 100 may for example comprise one or a plurality of computers 101-103, a server 104, peripheral devices (not shown) such as printers, sensors . . . Generally a connection provided by the network between the computers 101-103 and the server 104 allows to receive or send information from any computer or server to any other computer or server. In other words the connection from each computer 101-103 or the server 104 to the network enables bi-directional communication to and from the network. In particular the computers 101-103 may request information from the server 104 and receive the information from the server 104 through the network.

An example of a service that uses the bi-directional communication is the exploitation of advertisement space on a display of a computer. Advertisement space may for example be implemented as one or many banners included in a graphical page generated by an application running on the computer. In order to exploit the advertisement space, the application triggers a process of advertisement in which a message is transmitted to a specific advertisement server through the network. In response to the message, the advertisement server sends determined advertisement data to the computer through the network. The advertisement data is inserted in the banner as appropriate and may be processed and displayed as part of the graphical page.

Advertising is a common way of generating revenues. The revenues of advertising may for example be used to finance a service made available on a widespread network known as the INTERNET. The service is typically requested from a server connected to the INTERNET by a client also connected to the INTERNET and using an application called INTERNET browser. The service is provided by way of software downloaded from the server by the client and subsequently run by the client. The service typically produces a graphical output that is displayed to be seen by a user of the client. The service provides advertisement space that allows to render advertisement to the user.

An advertiser will generally want to determine a number of parameters under which his advertisement is to be brought and displayed to the user. The parameters may for example include a number of times that the advertisement is displayed during a certain period of time, and in which type of service the advertisement will appear.

Referring to FIG. 2, the number of parameters under which advertisement is to be brought to the user is used to prepare an advertisement campaign which is represented in box 200. The advertisement campaign may include parameters from one or many advertisers for a number of distinct advertisements to be displayed in one or a plurality of available advertisement spaces. FIG. 2 further shows a server 201 and a computer 202 connected to the server 201 through a bi-directional communication link, such as for example the computer network shown in FIG. 1 or the INTERNET. For reasons of understanding FIG. 2 shows only one computer 202. However a plurality of computer may be connected to serve 201 using a bi-directional communication link. After a service is downloaded from the server 201 to the computer 202, it is run inside the computer 202. The running service triggers a request for advertisement in order to display advertisement in available advertisement space, and sends the request to the server 201. Subsequently the serve 201 checks with the management of the advertisement campaign in box 200 which advertisement should be sent to the computer 202, and sends the selected advertisement to the computer 202.

The server 201 allows to count how often a specific advertisement was sent out to a specific service, and to submit the resulting count to the management of the advertisement campaign in the box 200. The resulting count is used by the management of the advertisement campaign in box 200 to optimise a selection of advertisements to be sent to the requesting services in order to meet the number of parameters specified by the advertiser(s). The count may be realised by the server 201 regardless of the number of computers connected to the server 201, and requesting the specific advertisement. As an example, the parameters provided by an advertiser for an advertisement campaign might specify that an advertisement A1 needs to be displayed 10000 times in an advertisement space S1 in a service SE1, in a period of time of 30 days. During the period of 30 day, every time the service SE1 is run on a computer connected to the server 201, the corresponding computer sends a request for advertisement to the server 201, submitting the parameters corresponding to the service SE1 and the advertisement space S1. Accordingly, the management of the advertisement campaign 200 checks which advertisement should be selected. If the advertisement A1 has not yet been displayed 10000 times as specified, then the advertisement A1 is sent to the requesting computer and the number of times that the advertisement A1 has been displayed is updated by 1 in the management of the advertisement campaign 200.

FIG. 3 shows a further network configuration known from prior art as used in a television network. A broadcast operator 300 broadcasts information including services and audio/visual data, to subscriber Set Top Boxes (STBs) 301-303. The STBs allow to process information received and output resulting audio and video to appropriate rendering devices (not shown). The broadcast may for example be achieved by means of satellite transmission, cable network, or terrestrial radio transmission. The STBs may to a certain extend be compared to the computers 101-103 from FIG. 1 or the computer 202 from FIG. 2 in that they allow to run a service resident in the STB or received by way of broadcast, and that advertisement space is thereby made available for advertisers. One difference between the network shown in FIG. 3 and the networks shown in FIGS. 1 and 2 is that the STB may not send any information to the broadcast operator. More particularly, it is not possible for a STB to send a request for advertisement when the service is run. Hence advertisement provided by a management of an advertisement campaign 304 through server 305 needs to be broadcasted periodically to all the STBs 301-303 in order to be available when a service requiring advertisement is run on any one of the STBs 301-303. It is not possible in this network to count how often a specific advertisement was used inside a specific service because the server 300 may not receive any request from the STBs 301-303. As a consequence the management of advertisement campaign 304 may not have full control on the number of times that advertisements are used by services run on the STBs.

SUMMARY OF THE INVENTION

In a first aspect the invention provides a method for selecting advertisement in a Set Top Box (STB) of a television network. The method comprises receiving advertisement selection information for at least one association of a determined advertisement space with a determined advertisement, corresponding for each association to a value of probability for selecting the determined advertisement for the determined advertisement space. The method further comprises attributing for each association containing the determined advertisement space a range of values to the value of probability corresponding to the association, the range of values being exempt of overlap with ranges of values corresponding to distinct associations containing the determined advertisement space. A selection of an advertisement for the determined advertisement space is triggered and a random value or a pseudo-random value generated. The determined advertisement is selected if the random value or pseudo-random value falls into the range of values attributed to the value of probability for selecting the determined advertisement for the determined advertisement space.

Preferably the method fo selecting advertisement further comprises computing the value of probability for selecting the determined advertisement for the determined advertisement space depending on at least a desired number of times that the determined advertisement is to be displayed, and broadcasting the value of probability through the television network.

Preferably the value of probability is computed depending on the desired number of times that the determined advertisement is to be displayed within a determined period of time.

Preferably the determined advertisement is broadcast through the television network, and the determined advertisement is retrieved in the STB on selecting the determined advertisement. The determined advertisement is displayed in the determined advertisement space.

In a second aspect the invention provides a method for obtaining advertisement selection information on a broadcast side in a television network, that comprises detecting in an application to be broadcast information about an advertisement space available for selecting advertisement, storing the information about the advertisement space in an inventory, and retrieving the information about the advertisement space to compute for each one of at least one advertisement intended for the advertisement space a value of probability for selecting the advertisement intended for the advertisement space.

In a third aspect the invention provides a method for obtaining an advertisement selection information on a broadcast side in a television network, the advertisement selection information comprising values of probabilities. For a determined advertisement, a final number of selections is determined respectively for each one of one or a plurality of advertisement spaces. The obtained one or plurality of final numbers of selections is converted into values of probabilities for selecting the determined advertisement in the respective one or plurality of advertisement spaces. The one or plurality of values of probabilities for selecting the determined advertisement is broadcast.

In a fourth aspect the invention provides a method for selecting advertisement in a STB of a television network. The method comprises receiving advertisement selection information for at least one association of a determined advertisement space with a determined advertisement, corresponding for each association to a range of values, the range of values being exempt of an overlap with ranges of values corresponding to distinct associations containing the determined advertisement space. A selection of an advertisement for the determined advertisement space is triggered and a random value or a pseudo-random value generated. The determined advertisement is selected if the random value or the pseudo-random value falls into the range of values corresponding to the association containing the determined advertisement and the determined advertisement space.

In a fifth aspect the invention provides a method for selecting advertisement in a Set Top Box (STB) of a television network. The method comprises receiving advertisement selection information for at least one association of a determined advertisement space with a determined advertisement, corresponding for each association to a value of probability for selecting the determined advertisement for the determined advertisement space. A selection of an advertisement for the determined advertisement space is triggered, and a random value or a pseudo-random value generated. The determined advertisement is selected if the random value or pseudo-random value relates to the value of probability for selecting the determined advertisement for the determined advertisement space.

In a sixth aspect the invention provides a method for selecting advertisement in a Set Top Box (STB) of a television network, wherein advertisement selection information is received for one or a plurality of advertisement associations, each advertisement association associating an advertisement space with an advertisement, the advertisement selection information corresponding for each advertisement association to a value of probability for selecting the advertisement for the advertisement space. A selection of an advertisement for a determined advertisement space is triggered, and a random value or a pseudo-random value generated. An advertisement is selected using the random value or the pseudo-random value, by selecting a determined advertisement association that associates an advertisement with the determined advertisement space and for which the corresponding advertisement selection information has a value of probability that relates to the random value or the pseudo-random value. The advertisement associated in the determined advertisement association is used.

BRIEF DESCRIPTION OF THE FIGURES

The invention will now be described in greater detail with reference to the accompanying drawings, in which.

EXAMPLE OF PREFERRED EMBODIMENTS

Advertisement Campaign

Figure 1:
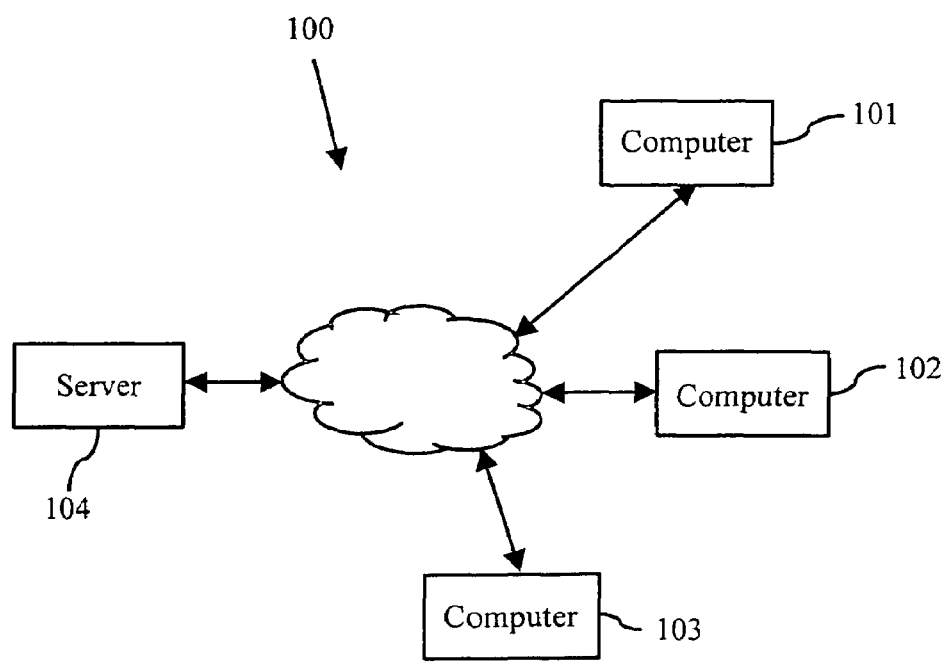
FIG. 1 represents a computer network known from prior art, FIG. 2 schematically illustrates an example of an advertisement campaign implemented in prior art.

An advertisement campaign generally defines for a given period of time, how many times a determined advertisement is to be displayed in a determined advertisement space. The following table 1 illustrates an example of an advertisement campaign

TABLE 1

|             | E1 | E2 | E3 | E4 | E5 |
|-------------|----|----|----|----|----|
| C1 (10000)  | *  | *  |    |    |    |
| C2 (100000) | *  | *  | *  | *  |    |
| C3 (20000)  |    | *  | *  |    |    |
| C4 (3000)   |    |    |    | *  | *  |

The first column indicates advertisements C1-C4 followed respectively in brackets by the total number of desired displays during a given period, for example during 1 month. For example the advertisement C1 needs to be displayed 10000 times during 1 month.

It is understood that the number of displays for an advertisement may be achieved by displaying the advertisement on any number of computers or STB. For example it may be achieved by displaying the advertisement 100 times respectively on 100 computers or STBs.

It is further understood that the number of displays for an advertisement may be distributed in any determined distribution among the selected advertisement spaces if more than 1 advertisement space is selected.

The first line indicates available advertisement spaces E1-E5.

A star "*" indicates that the advertisement space of the corresponding column is selected for the advertisement of the corresponding line.

Generally the management of the advertisement campaign also possesses an estimation for the number of expected displays of an advertisement space during the given period of time. This information is useful for predicting a feasibility of the advertisement campaign. For example it would be questionable to plan 10000 displays of advertisement C1 on advertisement spaces E1 and E2, if the estimation for the total number of expected displays of the advertisement spaces E1 and E2 taken together is inferior to 10000.

Furthermore, the estimation for the number of displays of advertisement spaces may help to choose from 2 or more advertisements to be displayed on an advertisement space. For example if the advertisement space E1 is displayed, either C1 or C2 must be selected for display. In case the estimated number of displays of the advertisement space E1 is close to or smaller than the desired number of displays for C1 and C2 taken together, it might be useful to display the advertisement C2 more often than the advertisement C1 in order to achieve a more equitable distribution of the number of available displays of the advertisement space E1 between C2 and C1, since C2 is being required to be displayed more often than C1.

In some cases the management of the advertisement campaign may need to implement a distribution of the number of displays for an advertisement according to specific numbers. The following Table 1' illustrated an example of such a given distribution:

TABLE 1'

|             | E1    | E2    | E3 | E4 | E5 |
|-------------|-------|-------|----|----|----|
| C1 (10000)  | *     | *     |    |    |    |
| C2 (100000) | 20000 | 40000 | *  | *  |    |
| C3 (20000)  |       | 3000  | *  |    |    |
| C4 (3000)   |       |       |    | *  | *  |

The advertisement compaign as illustrated in Table 1' can be expressed using a similar terminology as for Table 1, by subdividing the number of displays for advertisements C2 and C3 in a plurality of lines, using new advertisement names C'2, C"2 and C'"3 for C2, and C'3 and C"3 for C3. This is illustrated in the following Table 1":

|             | E1 | E2 | E3 | E4 | E5 |
|-------------|----|----|----|----|----|
| C1 (10000)  | *  | *  |    |    |    |
| C'2 (20000) | *  |    |    |    |    |
| C"2 (40000) |    | *  |    |    |    |
| C'"2 (40000)|    |    | *  | *  |    |
| C'3 (3000)  |    | *  |    |    |    |
| C"3 (17000) |    |    | *  |    |    |
| C4 (3000)   |    |    |    | *  | *  |

Selection of Advertisement for an Available Advertisement Space

Figure 2:
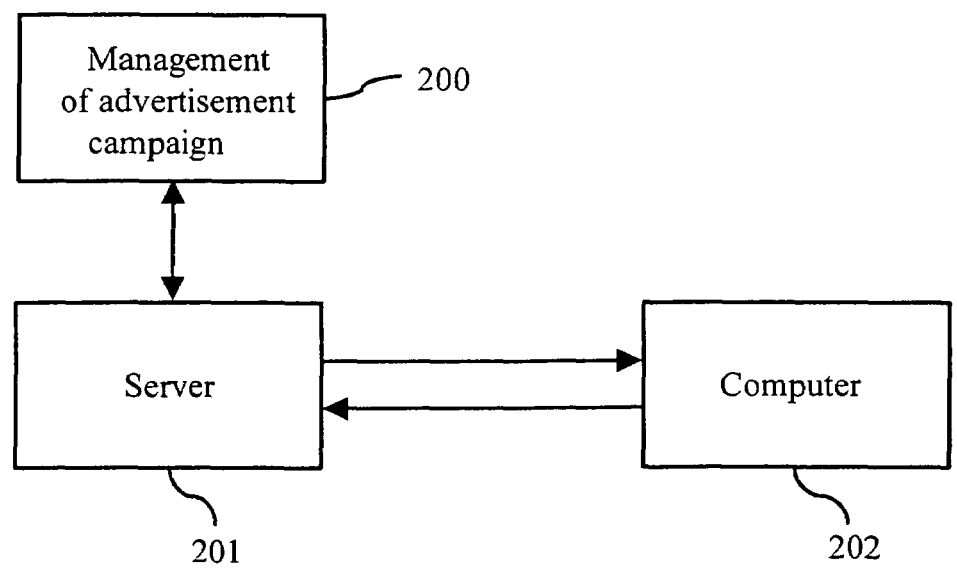

In known prior art systems of the type shown in FIGS. 1 and 2, where a bi-directional communication link exists. between a computer or STB and a server, the advertisement is selected on the side of the server after receiving a request from a computer or STB. The request includes an identification (ID) of the advertisement space, e.g., one or many of the advertisement spaces E1-E5. Using the ID, the management of the advertisement campaign selects an advertisement, that is sent from the server to the requesting computer or STB. The number of displays for each advertisement is updated every time an advertisement is sent to a computer or STB. There is a certain margin of unpredictability in the number of displays of a determined advertisement on a number of computers or STBs. It may well be that certain computers or STB display the determined advertisement space many times, while other computers or STBs never display the determined advertisement space. Nevertheless it is possible to know when the total number of desired displays of an advertisement is reached.

Figure 3:
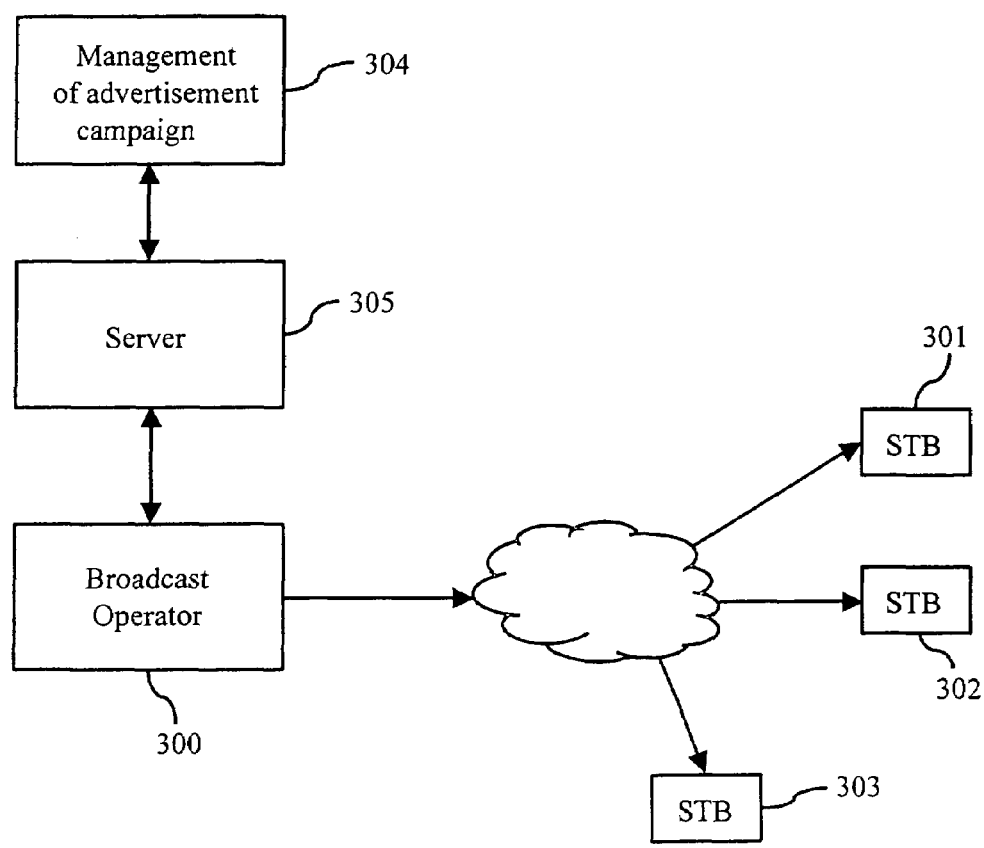
FIG. 3 represents a television network known from prior art.

In prior art systems of the type shown in FIG. 3 it is difficult to know when a determined number of displays of the determined advertisement has been achieved by the receiving STBs, because there is no return to the server from the STBs on the advertisement space(s) displayed by the STBs.

According to an embodiment of the invention, selection information corresponding for each advertisement space to a probability for selecting a determined advertisement is computed using information from the advertisement campaign. This will now be explained in more detail.

The probabilities for selecting a determined advertisement aim at achieving the desired number of displays as specified in the advertisement campaign.

Based on the advertisement campaign parameters listed in table 1, an example result of probabilities is given in the following list 1, for displaying advertisements C1-C4 in advertisement spaces E1-E5:

List 1

| For E1: | 40% C1  | and | 60% C2; |     |         |
| For E2: | 30% C1  | ,   | 20% C2  | and | 50% C3; |
| For E3: | 30% C2  | and | 70% C3; |     |         |
| For E4: | 55% C2  | and | 45% C4; |     |         |
| For E5: | 100% C4.|     |         |     |         |

The line for E1 should be understood to mean that the probability for displaying the advertisement C1 in E1 is 40% whereas the probability for displaying the advertisement C2 in E1 is 60%. A similar reading should be applied for the lines corresponding to E2-E5. In particular the line for E5 indicates that the probability for displaying C4 in E5 is 100%.

The probabilities indicated in percentage in the above listing have been obtained by applying an algorithm to the advertisement campaign parameters as appropriate. Various algorithms known from prior art be may used to obtain the probabilities.

Figure 4:
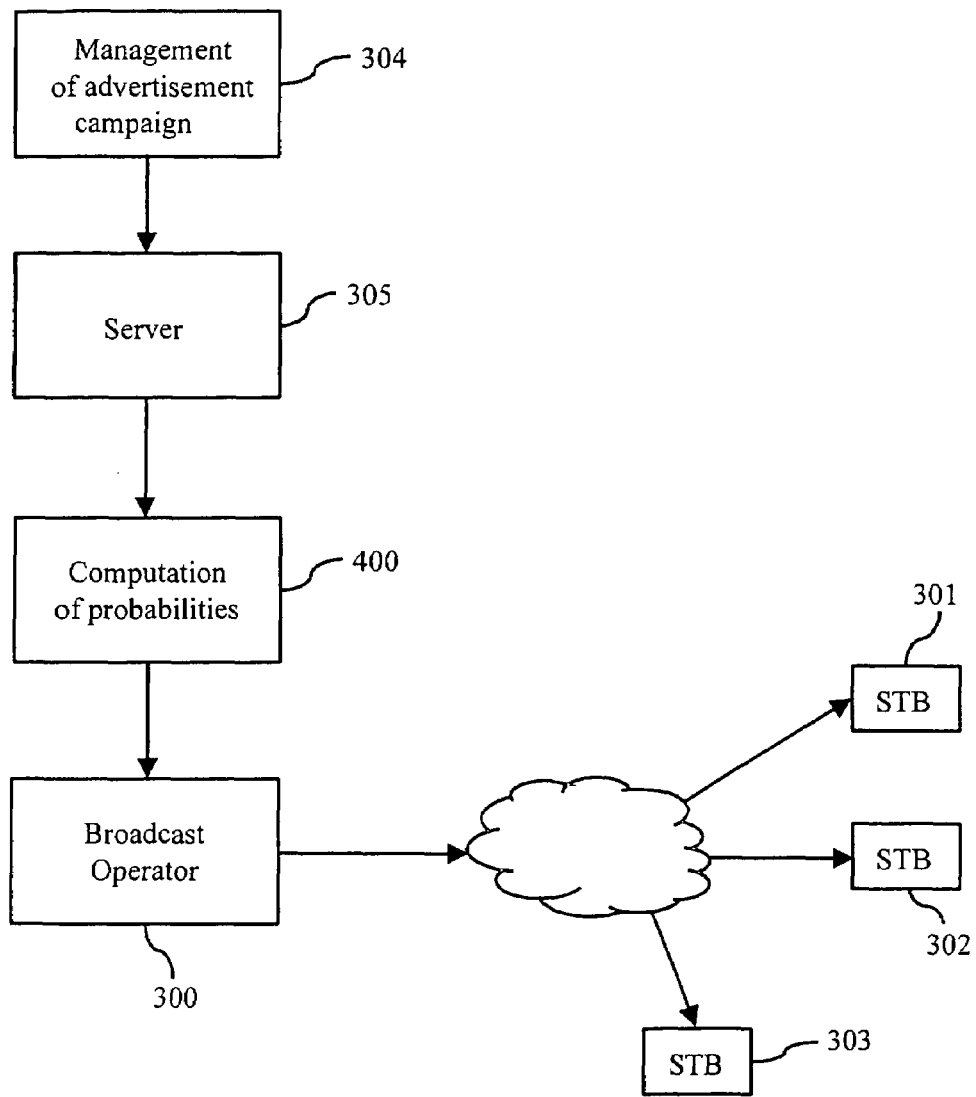
FIG. 4 illustrates an example of a television network in accordance with the present invention.

Referring to FIG. 4 an example of a system using a computation of probabilities in a box 400 is shown. The system in FIG. 4 represents a network configuration similar to the network configuration shown in FIG. 3 and same reference numbers have been used to designate same elements. The computation of probabilities in the box 400 allows to compute the probabilities for selecting a determined advertisement for a determined advertisement space using parameters provided through the server 305 by the management of the advertisement campaign 304, and to broadcast the obtained probabilities through the broadcast operator 300 to the STBs 301-303 over the network.

The probabilities are received in the STBs 301-303 and processed in order to select an advertisement each time an advertisement space is made available for display.

Figure 5:
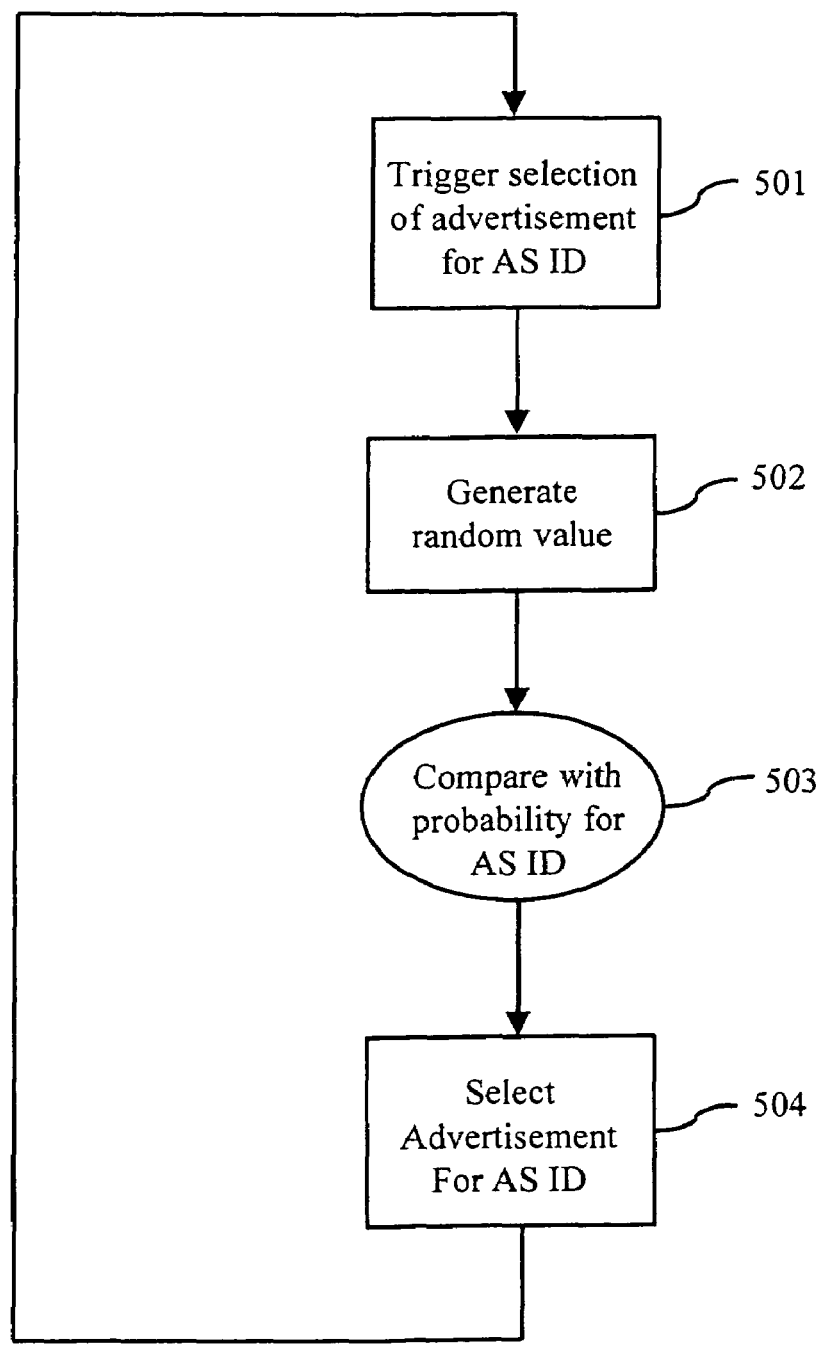
FIG. 5 contains a flowchart illustrating an example of advertisement selection in accordance with the present invention.

Referring to FIG. 5 an example of a method for selecting an advertisement as implemented in a STB is illustrated. In a box 501 a selection of an advertisement for an Advertisement Space (AS) ID is triggered. The trigger may be generated for example in an application that is running in the STB. The trigger is generally generated whenever an AS is made available. Subsequently a random value or a pseudo-random value is generated in box 502. For reasons of better understanding, the present example will continue to mention the use of a random value only, but it is understood that the pseudo-random value may also be used. The random value will be used to select an advertisement using the received probabilities. The random value may for example be a number comprised between 0 and 100 in order to correspond to probabilities expressed in a value of percentage.

The random value is compared to the value(s) of probability(ies) received for the AS ID in box 503. One example for matching the random value with the received probabilities is to attribute to each received probability a range of values inside the range [0, 100[, i.e. in the range of 0 to 100. Assuming the received probabilities are expressed in percentages and have values P1, . . . , Pi, with i being the number of probabilities received for the AS ID and the sum of all probabilities being $$100\left(\sum_{j=1}^{i} Pj = 100\right),$$

then the range of values attributed to Pj (j=1 . . . i) would be respectively

[0, $P1$[for $P1$, [$P1$, $P1 + P2$[for $P2$, ... , and $$\left[\sum_{j=1}^{i-1} Pj, \sum_{j=1}^{i} Pj\right[\text{for } Pj.$$

Hence if a random value falls in the range of a received probability Pj, then the probability Pj for the AS ID and the corresponding advertisement are selected in box 504.

As an example we will indicate range of values for probabilities given in list 1 here above. Considering the probabilities given for E2, we have:

$P_{1,E2}$=30% for C1,
$P_{2,E2}$=20% for C2, and
$P_{3,E2}$=50% for C3.

According to these values we respectively obtain following ranges for the probabilities to select C1, C2 or C3: [0, 30 [, [30, 50(=30+20)[ and [50, 100(=30+20+50)[. Hence C1 is selected for any random value in the range [0, 30[,
C2 is selected for any random value in the range [30, 50[, and
C3 is selected for any random value in the range [50, 100[.

The selected advertisement is either received through broadcast directly from the broadcaster or downloaded from a storage space in the STB as appropriate, and made available for display in the AS ID (not shown in FIG. 5).

In a preferred embodiment of the example system shown in FIG. 4, the STBs 301-303 may have a return link (not shown in FIG. 4) to the broadcast operator 300 that allows each STB to sent information to the broadcast operator. The return link may for example be a telephone connection established as necessary using a modem at an output of the STB. The return link may also be implemented over a cable network or any other possible way of transmitting information to the broadcast operator. The return link allows the STB to send information about the number of times that an advertisement was actually used in an advertisement space. This information may be used by the management of the advertisement campaign 304 to obtain new probabilities in case the number of times that an advertisement was actually used differs from the computed values that are based on estimations of the number of times that an advertisement space is made available.

Computing Probabilities for Selecting an Advertisement

An example for computing probabilities for selecting an advertisement will now be described.

Definitions

Following definitions are used in this example:

{E1, E2, . . . , En} are n advertisement spaces,
{C1, C2, . . . , Cm} are m advertisements that are each intended to be displayed in 1 or more advertisement spaces of a subset of the set of n advertisement spaces,
$e_i$ is an estimation for the total number of expected displays of the advertisement space Ei,
$c_i$ is the number of times that an advertisement $C_i$ is to be displayed in total in all desired advertisement spaces,
$x_{ij}$ is the actual number of times that the advertisement $C_i$ is to be displayed in the advertisement space Ej,
$a_{ij}$ are Boolean constants defined such that $a_{ij}$=1 if $C_i$ is to be displayed in the advertisement space $E_j$, and $a_{ij}$=0 if $C_i$ is not to be displayed in the advertisement space $E_j$.

Conditions

The following condition should be verified for the values $x_{ij}$ in relation to the number of times $c_i$ that an advertisement $C_i$ is to be displayed:

$$\sum_{k=1}^{n} a_{ik} x_{ik} = c_i \text{ with } 1 \leq i \leq m \quad (1)$$

Furthermore, the number of times of displays on each advertisement space Ej underlies the following relation to $x_{ij}$:

$$\sum_{k=1}^{m} a_{kj} x_{kj} \le e_j \text{ with } 1 \le j \le n \quad (2)$$

Ideal Solution

It is an aim of this computation to determine solutions for the values $x_{ij}$ such that ideally:
- all equations defined in (1) are verified;
- all equations defined in (2) are verified;
- For each advertisement $C_i$, the number of times $c_i$ that it is to be displayed is distributed among a determined 1 or more advertisement spaces of a subset of the set of n advertisement spaces, proportionally to the estimated number of expected displays of the concerned advertisement spaces.

The estimated total number of times of displays for advertisement $C_i$ is:

$$\sum_{k=1}^{n} a_{ik} e_k$$

Hence an ideal number of displays $x_{ij}*$ for the advertisement $C_i$ on the advertisement space Ej is obtained by distributing the number of times $c_i$ that the advertisement $C_i$ is to be displayed proportionally to the estimation $e_j$ for the advertisement space $E_j$ as follows:

$$x_{ij}^* = \frac{c_i e_j}{\sum_{k=1}^{n} a_{ik} e_k} \quad (3)$$

As an example we may consider the following table 2 in which number have been given for various parameters:

TABLE 2

|  | E1 ($e_1$ = 100) | E2 ($e_2$ = 50) | E3 ($e_3$ = 200) |
|---|---|---|---|
| C1 ($c_1$ = 80) | 53.33 | 26.67 |  |
| C2 ($c_2$ = 20) |  | 4 | 16 |

According to Table 2, two advertisements C1 and C2 are to be displayed respectively 80 and 20 times distributed over advertisement spaces E1/E2 and E2/E3. Applying the equation (3) results in ideal numbers of display times 53.33 and 26.67 for C1, 4 and 16 for C2.

The computation should allow either to achieve the ideal number of displays or an optimised value thereof.

Suggested Methodology

An example of methodology is suggested for obtaining final solutions for $x_{ij}$ which are either equal or as close as possible to the ideal solutions $x_{ij}*$.

The methodology bases on a list of priorities given to objectives listed in decreasing order of importance as follows:
Priority 1: maximize the total number of times of displays,
Priority 2: conform in the best possible way to equations (1),
Priority 3: assure a proportional distribution of advertisements among advertisement spaces.

It is understood that the order of priority is given as an example only and may be varied in other examples.

The suggested methodology may be implemented in one or many steps.

$1^{st}$ Step—Computation of an Ideal Solution

The ideal solutions $x_{ij}*$ are calculated using the equations (3). This may easily be done by substituting values to the variables used in equations (3). The solutions are then inserted in equations (1) and (2) to check if these equations are verified. If equations (1) and (2) are verified, then the solutions are used to compute probabilities for selecting advertisements as is described in more detail in a dedicated section of this specification below.

Using the example of Table 2, it is easily found that equations (1) and (2) are verified by the ideal solution as follows:

$$\begin{cases} x_{11} + x_{12} = 53.33 + 26.67 = 80 \\ x_{22} + x_{23} = 4 + 6 = 20 \\ x_{11} \le 100 \\ x_{12} + x_{22} \le 50 \\ x_{23} \le 200 \end{cases}$$

$2^{nd}$ Step—Preliminary Computation of a Maximum for the Number of Displays

In case the equations (1) and (2) are not verified in the $1^{st}$ step, then a $2^{nd}$ step is implemented to obtain solutions. According to the priority 1, the total number of times of displays should be maximized. This may be expressed by maximizing a value of a function Z as follows:

$$Z = \sum_{i=1}^{m} \sum_{j=1}^{n} x_{ij}^* \quad (4)$$

A maximized value for Z may be referenced as $Z_{max}$.

The constraints imposed by equation (1) are based on equality and are therefore very restrictive. By using the constraints of equation (1) it may in certain cases happen that no solution may be found, or that a maximum value $Z_{max}$ may in fact not be as high as desired.

It is possible to overcome this situation by introducing a new constraint in replacement of equation (1). The new constraint may be less restrictive than the constraint of equation (1). A new computation of $Z_{max}$ is made using the new constraint. The new constraint may be expressed as follows:

$$\sum_{k=1}^{n} a_{ik} x_{ik} \le c_i \text{ for } 1 \le i \le m \quad (1')$$

Next a solution should be found that verifies equations (1') and (2) and maximizes the value of the function Z.

Maximizing the function Z corresponds to solving a linear optimisation under constraint. The function Z in equation (4) may be maximized using an appropriate algorithm known from prior art and this will not be explicated here in greater detail. One such known algorithm is known under the name "Simplex".

The resulting value $Z_{max}$ is a reference of a value for Z that should be aimed when inserting a set of solutions for $x_{ij}$ in equation (4). In order words, when applying values of a solution in equation (4), the resulting Z should be as close as possible from $Z_{max}$.

Next a solution is searched for equation (4) under constraint of equations (1) and (2) by executing a linear optimisation under constraint. If a resulting value of Z is considered to be different from $Z_{max}$ in an acceptable margin, then the solution is considered to be final. If on the other hand a resulting value of Z is considered to be different from $Z_{max}$ in an unacceptable margin, then a new $Z_{max}$ is computed under a further new constraint for the number of displays.

The further new constraint, which introduces a greater tolerance for the number of displays, is achieved by introducing a levels of tolerance $\tau_i$ on the number of displays as follows:

$$c_i - \tau_i \leq \sum_{k=1}^{n} a_{ik} x_{ik} \leq c_i + \tau_i \text{ for } 1 \leq i \leq m \quad (1'')$$

Next a solution should be found that verifies equations (1") and (2) and maximizes the function Z of equation (4) using the appropriate algorithm known from prior art.

The levels of tolerance $\tau_i$ may be increased as long as no solution is found or if the solution is found but is considered to be outside of the determined acceptable margin.

$3^{rd}$ Step—Final Adjustment of Values for the Number of Displays

Once the solution is found in the $2^{nd}$ step, it is necessary to compute a final adjustment of the values for the number of displays in order to assure that the number of times an advertisement is displayed is distributed among the desired advertisement spaces proportionally to the estimations of the number of displays for the advertisement spaces.

A new constraint is introduced in addition to equation (1') and (2) or equations (1") and (2) depending on how the solutions were computed. The new constraint introduces a level of tolerance $\epsilon$ as follows:

$$Z_{max} - \varepsilon \leq \sum_{i=1}^{m} \sum_{j=1}^{n} x_{ij} \quad (5)$$

Furthermore a value of a function Z' is to be minimized under constraint of equation (5), thereby minimizing a quadratic error between a final solution and the ideal solution. The function Z' reads as follows:

$$Z' = \sum_{i=1}^{m} \sum_{j=1}^{n} (x_{ij} - x_{ij}^*)^2 \quad (6)$$

Minimizing the function Z' corresponds to solving a non-linear optimisation under constraint. This may be done using an algorithm known from prior art and will not be described in more detail here.

After having computed the adjustments on the solutions, the obtained final solutions may be used to compute probabilities as described in the following section.

Computation of Probabilities

For each advertisement space Ek, we obtain a set $\{a_{1k}x_{1k}, \ldots, a_{nk}x_{nk}\}$ of number of times of displays for the advertisements. Each number of times of display $a_{ik}x_{ik}$ needs to be converted into a probability Pik for selecting an advertisement $C_i$ in the advertisement space Ek as follows:

$$Pik = \frac{a_{ik}x_{ik}}{\sum_{j=1}^{n} a_{jk}x_{jk}}$$

In total we obtain a set of probabilities $\{P_{11}, \ldots, P_{m1}, P_{12}, \ldots, P_{m2}, \ldots, P_{1n}, \ldots, P_{mn}\}$. The set of probabilities is broadcast to the STBs and used to select an advertisement every time an advertisement space is made available.

Inventory of Advertisement Spaces

In order to prepare and advertisement campaign it is necessary to know which advertisement spaces can be made available to display advertisements, as a number of advertisement spaces may change over time.

Advertisement spaces are typically made available in applications running on a STB.

The applications may be software provided by the broadcast operator in form of interpretable code. One example of such interpretable code is known as JAVA code, and may be interpreted by a JAVA virtual machine in the STB as is well described in the prior art. The broadcast operator may insert advertisement space in the JAVA code as appropriate and keep an inventory list of the resulting available advertisement spaces.

Figure 6:
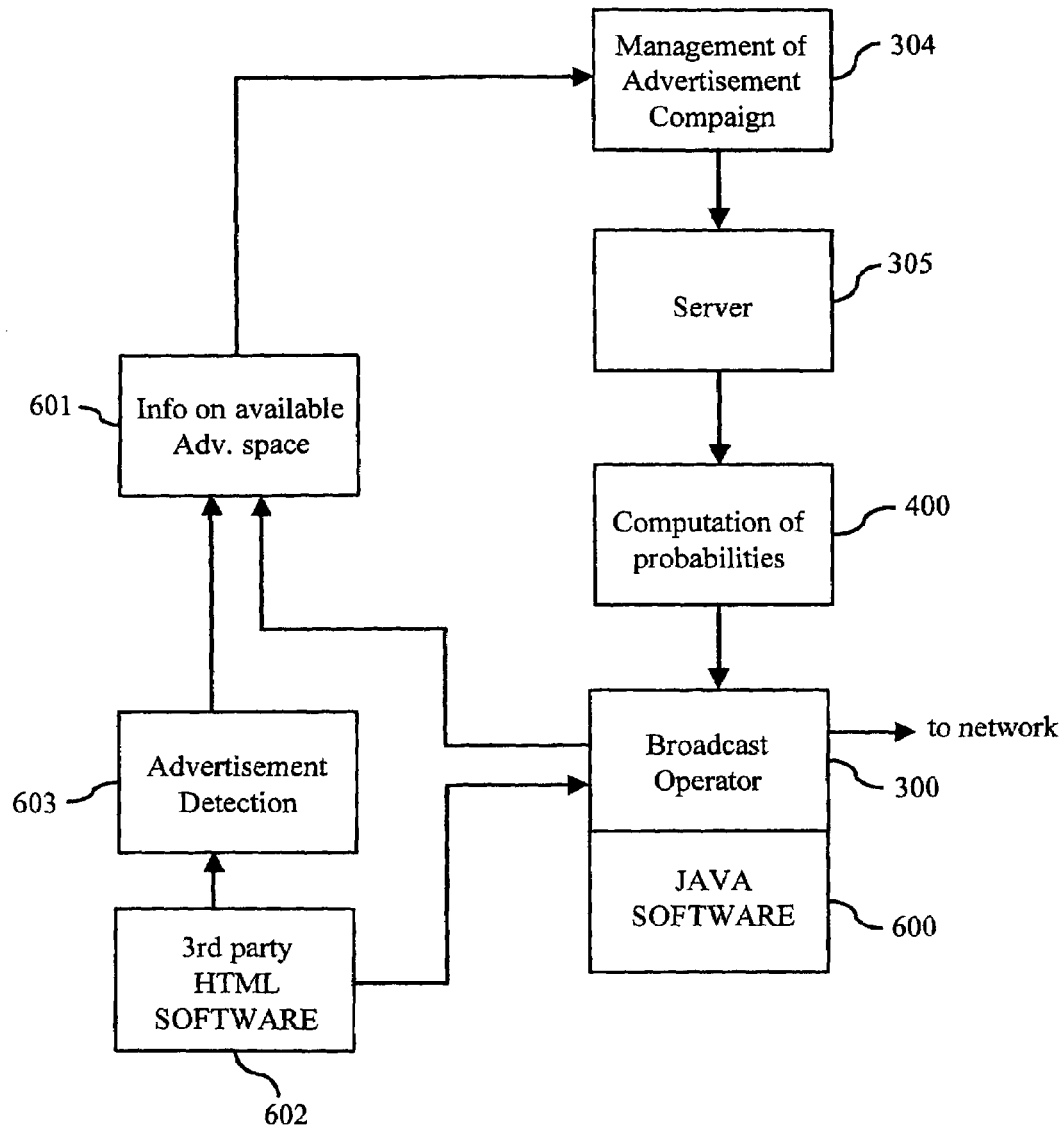
FIG. 6 illustrates an example of a broadcast operator side in a television network in accordance with the present invention.

Referring to FIG. 6, a system for managing an advertisement campaign on the side of the broadcast operator in a television network is shown. A number of boxes having the same references as in FIG. 4 represent the same elements as shown in FIG. 4. JAVA software provided by the broadcast operator 300 is represented in box 600. Information on available advertisement space in JAVA software 600 is transmitted to box 601 to be exploited by the management of the advertisement campaign in box 304.

Another type of application may be software provided by third parties in form of Hyper Text Markup Language (HTML) as shown in box 602. Such HTML code is processed by an INTERNET browser on the STB and results in the display of a graphical page at an output of the STB. The graphical page may include one or many advertisement spaces. HTML code may easily be modified by the third parties, including the addition or suppression of advertisement space. Therefore, in some cases, it may be difficult for the broadcast operator to know with a certain degree of reliability which advertisement space can be made available through the HTML code. One result of this is that the management of the advertisement campaign may not define any advertisement campaign for advertisement space in HTML code.

According to the invention the broadcast operator 300 may scan HTML code in box 603 before broadcasting the HTML code in order to detect a presence of advertisement spaces, and information is gathered in box 601 to maintain an inventory of available advertisement space in the HTML code for use by the management of the advertisement campaign in box 304.

In a preferred embodiment of the invention the HTML code is stored in a dedicated storage space (not shown in FIG. 6) by the broadcast operator before being broadcast. One advantage of the dedicated storage is that the HTML code is always immediately available for broadcast because it does not have to be retrieved from a separate server or from a third party. The HTML code is scanned before being stored in order to detect the presence of advertisement spaces, and to maintain an inventory of available advertisement space in the HTML code.

The scanning of the HTML code before broadcast or before storage depending on the implemented configuration, allows that the broadcast operator is always up to date on the available advertisement space in the HTML code, and hence the management of the advertisement campaign remains capable of planning campaigns.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for using an advertisement in a set-top box (STB) of a television network, wherein the method is performed at the STB, the method comprising:
   receiving, in the STB, advertisement selection information for a plurality of associations of a determined advertisement space with a determined advertisement, wherein the advertisement selection information comprises a probability value corresponding to each of the plurality of associations;
   triggering a selection of an advertisement for the determined advertisement space;
   generating, in the STB, a random value or a pseudo-random value;
   attributing a range of values to each probability value received in the STB, wherein the range of values corresponding to each probability value is attributed so as to avoid overlap with distinct associations comprising the determined advertisement space;
   selecting the determined advertisement when the random value or the pseudo-random value falls into the range of values corresponding to an association containing the determined advertisement and the determined advertisement space; and
   upon selection of the determined advertisement, displaying the selected advertisement.

2. The method for using an advertisement according to claim 1, further comprising:
   computing a value of probability for selecting the determined advertisement for the determined advertisement space depending on at least a desired number of times that the determined advertisement is to be displayed,
   broadcasting the value of probability through the television network.

3. The method for using an advertisement according to claim 2, further comprising:
   computing the value of probability depending on the desired number of times that the determined advertisement is to be displayed within a determined period of time.

4. The method for using an advertisement according to claim 1, further comprising:
   broadcasting the determined advertisement through the television network,
   retrieving in the STB the determined advertisement on selecting the determined advertisement,
   displaying the determined advertisement in the determined advertisement space.

5. The method for using an advertisement according to claim 2, further comprising:
   broadcasting the determined advertisement through the television network,
   retrieving in the STB the determined advertisement on selecting the determined advertisement,
   displaying the determined advertisement in the determined advertisement space.

6. The method for using an advertisement according to claim 3, further comprising:
   broadcasting the determined advertisement through the television network,
   retrieving in the STB the determined advertisement on selecting the determined advertisement,
   displaying the determined advertisement in the determined advertisement space.

7. The method for using an advertisement in a STB according to claim 1, further comprising:
   storing the determined advertisement in the STB.

8. A method for obtaining advertisement selection information in a set-top box in a television network, the advertisement selection information comprising values of probabilities, the method comprising:
   determining for a determined advertisement a final number of selections respectively for each one of a plurality of advertisement spaces;
   converting each of the final number of selections into the values of probabilities for selecting the determined advertisement in each of the respective plurality of advertisement spaces; and
   broadcasting through the television network the values of probabilities for selecting the determined advertisement.

9. The method according to claim 8, further comprising:
   computing for the determined advertisement the final number of selections respectively for each one of the one or the plurality of advertisement spaces, depending on a predetermined number of times for displaying the determined advertisement.

* * * * *

UNITED STATES PATENT AND TRADEMARK OFFICE
CERTIFICATE OF CORRECTION

PATENT NO. : 7,640,562 B2 Page 1 of 1
APPLICATION NO. : 10/533848
DATED : December 29, 2009
INVENTOR(S) : Bouilloux-Lafont et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 639 days.

Signed and Sealed this

Sixteenth Day of November, 2010

David J. Kappos
*Director of the United States Patent and Trademark Office*